United States Patent [19]
Bainbridge

[11] 3,739,885
[45] June 19, 1973

[54] TELESCOPIC POSITION ADJUSTING DEVICES

[75] Inventor: Wilfred Nicholas Bainbridge, Leamington Spa, England

[73] Assignee: Automotive Products Company Limited, Leamington Spa, Warwickshire, England

[22] Filed: June 15, 1971

[21] Appl. No.: 153,227

[52] U.S. Cl.............. 188/300, 248/354 H, 297/355
[51] Int. Cl............................................ F16d 63/00
[58] Field of Search ................. 188/289, 300, 314, 188/322; 248/354 H; 297/355

[56] References Cited
UNITED STATES PATENTS

| | | | |
|---|---|---|---|
| 3,356,186 | 12/1967 | Lambers ......................... | 188/300 X |
| 3,051,274 | 8/1962 | Porter.............................. | 188/300 |
| 2,658,588 | 11/1953 | Kanuch............................ | 188/300 |
| 3,471,140 | 10/1969 | Ballard............................ | 188/300 X |

*Primary Examiner*—George E. A. Halvosa
*Attorney*—Lawrence J. Winter

[57] ABSTRACT

An aircraft seat having an angularly adjustable back and a telescopic position adjusting device arranged to hold the seat back in any position to which it is set. The telescopic position adjusting device comprises a hollow plunger slidable in a closed ended cylinder. A floating piston divides the hollow plunger into two chambers one of which is filled with liquid and communicates with a passage in the closed end of the cylinder via the bore of a tubular stem which projects through an aperture in the plunger end wall. The other chamber is filled with compressed gas. A non-return valve controls liquid flow through the passage between the tubular stem bore and the liquid filled annular cylinder space surrounding the tubular stem. The non-return valve is spring closed and may be opened manually by a pin which is housed within the closed end of the cylinder for movement radially of the cylinder. The tubular stem has a radial flange which is engaged by a clip ring mounted in the cylinder and held in abutment with the closed end of the cylinder. The stroke of movement of the plunger can be altered by an adjustable sleeve which provides a stop surface for engagement by the plunger at one end of its stroke.

5 Claims, 3 Drawing Figures

PATENTED JUN 19 1973

INVENTOR
Wilfred N. Bainbridge
BY Lawrence J. Winter
ATTORNEY

TELESCOPIC POSITION ADJUSTING DEVICES

This invention relates to telescopic position adjusting devices such as are used, for example, to hold the angularly adjustable backs of seats in aircraft and vehicles in any position to which they are set, the said adjusting devices including energy storing means providing a force tending to urge the seat back or other component with which the device is used to one of its extreme positions and locking means normally preventing movement of the said seat back or other component by said force or by external acting forces normally applied thereto during use.

The telescopic position adjusting device according to the invention comprises a cylinder having a closed end and an open end, a hollow plunger slidable in said cylinder, the said plunger having an apertured end wall facing the closed end of the cylinder and being closed at its other end, a tubular stem mounted in said cylinder and extending through the aperture in the end wall of the plunger, a floating piston slidable in said hollow plunger and dividing the interior thereof into first and second chambers respectively between the said floating piston and the closed end of the plunger and between the floating piston and said apertured end wall, the said floating piston being urged by resilient means in said first chamber towards said apertured end wall, passage means in the closed end of the cylinder connecting the said second chamber through the bore of the tubular stem, to the annular space in the cylinder between the closed end thereof and the apertured end wall of the plunger, said second chamber and annular space being adapted to be filled with liquid, a non-return valve operative to prevent flow of liquid through said passage means and the bore of said tubular stem from said annular space into said second chamber and spring loaded to resist flow of liquid in the opposite direction, and externally operable means for opening said non-return valve.

The tubular stem may be formed at one end with an annular external flange which is held by retaining means against the closed end of the cylinder, and may carry stop means limiting outward movement of the plunger.

Stroke adjusting means may be provided for limiting the stroke of the plunger.

The stroke adjusting means may comprise a sleeve surrounding and having screw-threaded engagement with the cylinder and an annular stop surface on the plunger to co-operate with the end of said sleeve, releasable locking means being provided to hold the sleeve against rotation.

Alternatively, the stroke adjusting means may comprise a sleeve axially movable with one of the relatively axially movable members constituted by the cylinder and plunger and having a stepped aperture therein, a radial projection on the other of said members extending into said aperture, and means for selectively positioning said sleeve in the rotational sense to align the radial projection with any one of the steps in the aperture.

The resilient means in said first chamber may comprise compressed gas.

There will now be described, by way of example, one embodiment of a telescopic position adjusting device according to the invention, reference being made in the description to the accompanying drawings, in which.

Figure 1:
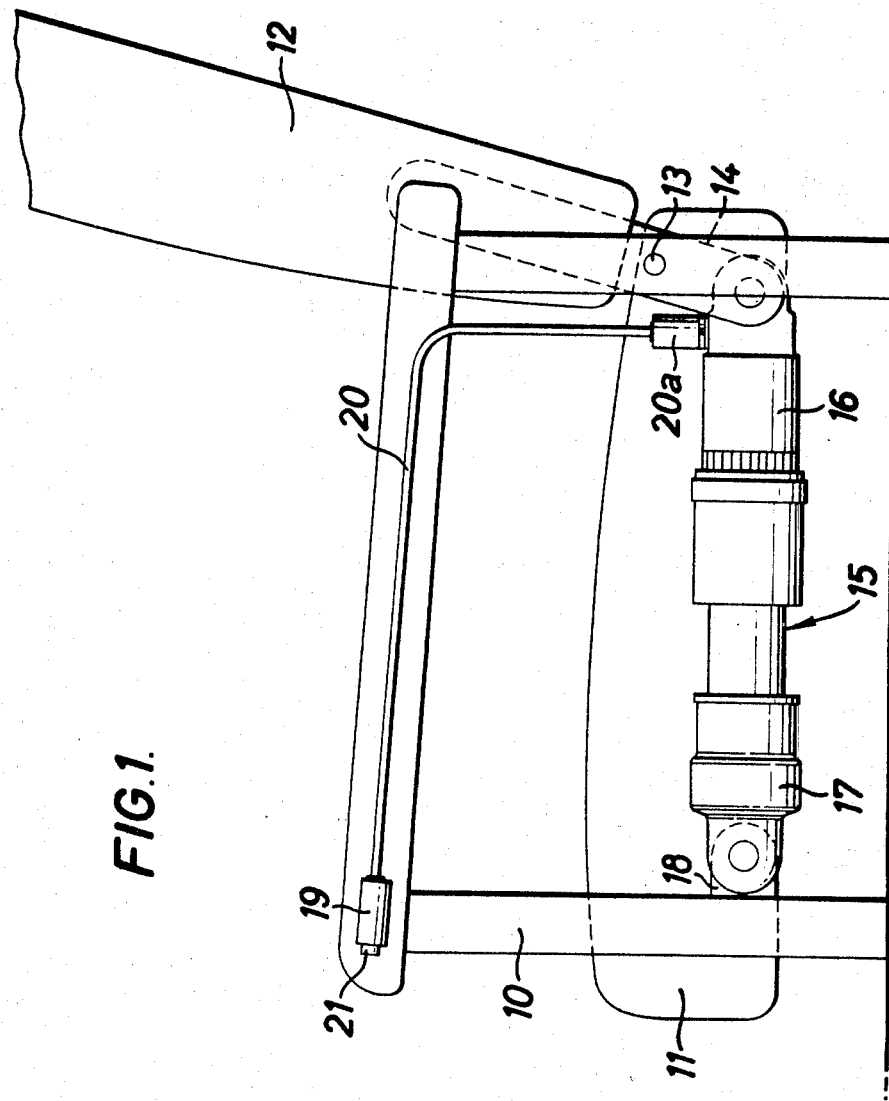
FIG. 1 is a diagrammatic side elevation of a seat, such as an aircraft seat, having an angularly adjustable back the position of which is adjustable by means of a device according to the invention.

Referring to FIG. 1 of the drawings a seat frame 10 supports a seat cushion 11, and a seat back 12 is pivotally mounted at 13 on the frame 10 so as to be angularly adjustable, the said seat back having secured to it an arm 14 depending below the pivot at 13. A telescopic position adjusting device 15 for providing angular adjustment of the seat back 12 comprises a cylinder 16 pivoted to the arm 14 and a plunger 17 pivoted to an anchorage 18 on the seat frame, so that movement of the seat back towards an upright position is accompanied by outward movement of the plunger 17 in the cylinder 16 and movement of the seat back towards a reclining position is accompanied by inward movement of the plunger 17 with respect to the cylinder 16. A valve in the telescopic position adjusting device 15, the purpose of which will be hereinafter described, is controlled, through a liquid pressure control system of the hydrostatic type including a master cylinder 19 connected, by a conduit 20, to a slave cylinder 20a for operating the said valve, the master cylinder being operated by a push button 21 mounted on the seat frame 10.

Figure 2:
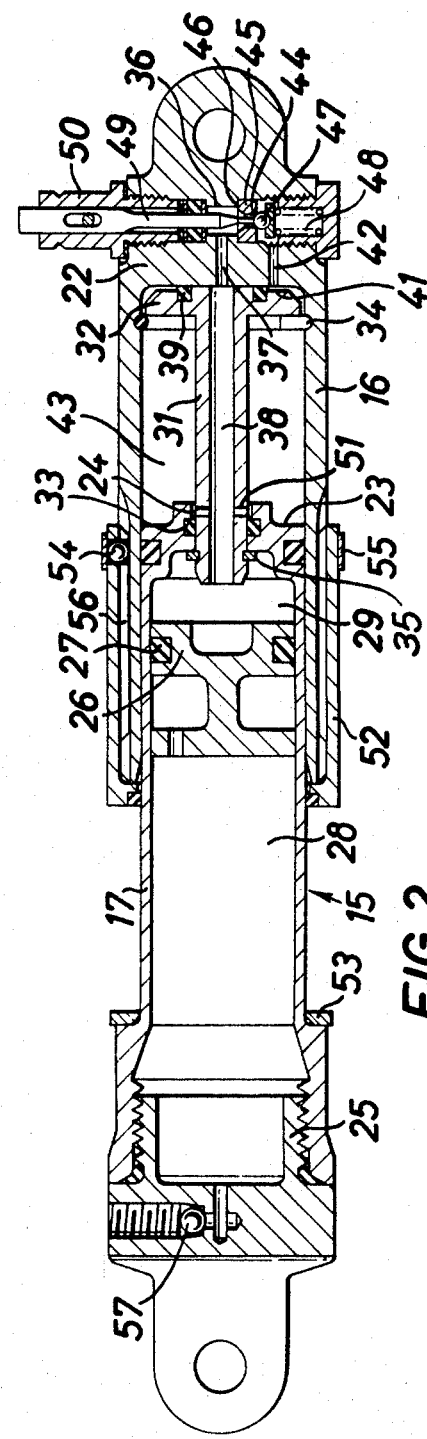
FIG. 2 is a sectional elevation of one form of telescopic position adjusting device according to the invention.

Referring now to FIG. 2, the cylinder 16 of the telescopic position adjusting device 15 is closed at one end by a head member 22 conveniently integral with the cylinder 16, and is open at its other end, the plunger 17, which is hollow being slidable in the cylinder 16 and projecting from the open end thereof. The plunger 17, at its end which lies inside the cylinder 16, has an end wall 23 formed with a central aperture 24. The bore of the plunger 17 is closed at its other end, for example, as shown in the drawing, by a screw plug 25, the cylinder head member 22 and the screw plug 25 being arranged for pivotal attachment to members such as the arm 14 and anchorage 18 shown in FIG. 1, between which the position adjusting device is mounted for use.

A floating piston 26 is mounted in the bore of the plunger 17 and carries a packing ring 27 engaging the wall of the plunger, thus dividing the interior of the plunger into first and second chambers 28 and 29.

A tubular stem 31, having an external radial flange 32 at one end, is mounted in the cylinder 16 so as to project through the central aperture 24 in the plunger end wall 23, the said stem 31 engaging a packing ring 33 mounted in the said aperture 24. The radial flange 32 on the stem is held, for example by a clip ring 34, against the inner face of the cylinder head member 22 and another clip ring 35 or equivalent device mounted on the other end of the tubular stem 31 provides a stop limiting outward movement of the plunger 17.

A diametral bore 36 in the cylinder head is connected by a central axial bore 37 in the said cylinder head member 22 to the bore 38 of the tubular stem 31, and a packing ring 39, mounted in an annular groove in the flange 32 of the said stem provides a fluid-tight connection between said axial bore 37 and the bore 38 of the stem. On the radially outer side of the said packing ring 39 the face of the flange is relieved as shown at 41, and a further bore 42 in the cylinder head member, connected to the diametral bore 36, opens in the inner face of the head member 22 opposite the relieved portion 41 of the flange, thus communicating with the annular space 43 in the cylinder 16 around the tubular stem 31.

A seat 44 is provided in the diametral bore 36 between the positions at which the axial bore 37 and the further bore 42 open thereinto, the said seat being conveniently formed in a plug 45 located against a shoulder 46 in the bore, and a ball 47, urged by a coiled compression spring 48 towards the seat 44, acts as a non-return valve preventing flow of liquid from said further bore 42 to the axial bore 37 and as a check valve resisting flow in the opposite direction. The ball 47, when seated, thus prevents flow of liquid from the annular space 43 into the plunger chamber 29, and provides resistance to flow of liquid from the plunger chamber 29 into the annular space 43.

Externally operable means, shown as a pin 49 guided in a tubular plug 50 screwed into one end of the diametral bore 36 are arranged to push the ball 47 off the seat 44 and thus provide free communication between the annular space 43 and the plunger chamber 29. The pin 49 is operable from a remote position by the push button 21 and liquid pressure control system shown in FIG. 1, or may be similarly operable by other means such as a Bowden cable.

One or more radial bores 51, of very small diameter, for example a few thousandths of an inch, are formed in the tubular stem 31 to connect the bore 38 thereof to the annular space 43 in the cylinder around the said stem, the said bore or bores 51 being so positioned that, when the stop 35 limiting outward movement of the plunger 17 is in engagement with the plunger end wall 23, they are just clear of the packing ring 33 mounted in the said end wall, on the side of the said packing ring nearer to the annular space 43.

The maximum stroke of the plunger 17 is determined by the length of the tubular stem 31, and the said stroke may be reduced by a screw-threaded sleeve 52 mounted externally on the cylinder 16 and cooperating with an abutment shoulder 53 on the plunger 17, the sleeve 52 being held against undesired rotation by a ball detent 54 mounted in a hole in the sleeve and urged inwardly by a circumferential spring clip 55 to engage in a longitudinal groove 56 in the cylinder wall.

To prepare the position adjusting device for use, liquid is inserted in the annular space 43 in the cylinder and in the chamber 29 in the plunger, the quantity of liquid being sufficient to position the floating piston 26, as shown in FIG. 2, at a short distance from the inner end of the plunger 17 when the device is fully extended, and compressed gas, preferably nitrogen, is fed into the plunger chamber 28, through a valve 57 in screw plug 25, so as to provide a force tending to extend the device.

It will be apparent that, when the non-return valve ball 47 is seated, inward movement of the plunger 17 is prevented by the trapping of liquid in the annular space 43 in the cylinder except that, when the device is fully extended, a small flow of liquid can take place through the radial bores 51 in the tubular stem, but any such flow is almost immediately stopped if inward movement of the plunger occurs, by the packing ring 33 in the plunger end wall 23 covering the said bores, so that no substantial movement can take place. The spring 48 acting on the non-return valve ball 47 is sufficiently strong to prevent the ball from being unseated by the force exerted by the compressed gas in the chamber 28 on the liquid in the plunger chamber 29 so that, with the ball 47 seated, the position adjusting device remains at any degree of extension to which it is set. Shortening of the device can be effected only by unseating the non-return valve ball 47 and exerting an external contracting force on the device, and extension can be effected either by unseating the non-return valve ball 47 to allow extension by the force exerted by the compressed gas, or by applying an external extending force.

With the telescopic position adjusting device mounted on an aircraft seat as shown in FIG. 1, rearward tilting of the seat back 12 is positively prevented when the non-return valve ball 47 is seated and can be effected only by unseating the said non-return valve ball, whereas movement of the seat back towards the substantially upright position can be effected by the force of the compressed gas in the chamber 28 if the non-return valve ball 47 is unseated, or can be effected without opening the non-return valve by applying a force to the seat back itself. Thus, an occupant of the seat can adjust its position in either direction by manipulating the non-return valve and leaning back on, or taking his weight off, the seat back, but a person wishing to restore a seat back or seat backs to the substantially upright position, for example after passengers have disembarked from an aircraft, can do this merely by pushing or pulling on the seat backs.

The small radial bores 38 in the tubular stem 31, when the device is fully extended, allow liquid to pass between the chamber 29 in the plunger 17 and the annular space 43 in the cylinder. Thus if, when the seat back is moved towards the upright position by a manual pull or push applied thereto, the pressure difference across the valve ball 47 is not sufficient to unseat it, and liquid cannot return to the annular space 43 through the valve, cavitation will occur in the said annular space 43 until the device is fully extended, and liquid will then flow through the radial bores 38 until the said annular space 43 is refilled. Flow of liquid can also take place through the radial bores 38 from the annular space 43 to the chamber 29 or vice versa when the device is fully extended to compensate for changes of the liquid volume due to expansion or contraction resulting from temperature changes.

Figure 3:
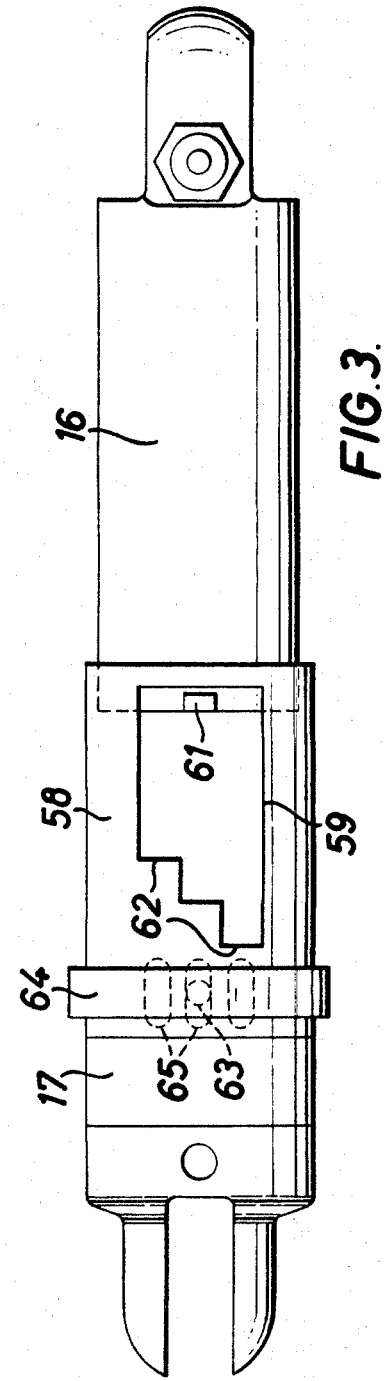
FIG. 3 is a plan view of a telescopic position adjusting device as shown in FIG. 2 but having a modified form of stroke adjusting means.

FIG. 3 shows a modified arrangement of means for adjusting the stroke of the position adjusting device. A sleeve 58 is mounted on the plunger 17 and is located against axial movement thereon by any suitable means, the sleeve 58, when the position adjusting device is fully extended, overlapping the adjacent end of the cylinder 16 as shown, and the overlap increasing as the device is contracted. A stepped aperture 59 is formed in the sleeve 58, and a radial projection 61 on the cylinder extends into the aperture. The sleeve 58 is rotatable on the plunger 17 to bring any one of the steps 62 in the aperture into line with the projection 61, so that the inward stroke of the plunger is limited by engagement of the projection 61 with the step with which it is aligned. The sleeve may be held in any angular position to which it is set by a ball detent 63 located in a hole in the sleeve 58 and urged by a circumferential spring clip 64 into any one of a plurality of angularly spaced notches 65 in the plunger 17.

It will be understood that the sleeve 58 may be mounted on the cylinder 16 to co-operate with a projection similar to the projection 61 on the plunger 17.

I claim:

1. A telescopic position adjusting device comprising a cylinder having a closed end and an open end, a hollow plunger with a centrally apertured end wall slidably extending into said cylinder, the other end wall of said plunger being closed and disposed outside of said cylinder, a floating piston disposed in said plunger and dividing it into a gas chamber filled with compressed gas adjacent its closed end wall and first liquid chamber adjacent its apertured end wall, a tubular member disposed in said cylinder having one end extending through said apertured end wall and in communication with said liquid chamber, flange means on the other end of said tubular member, clip means abutting said flange means to maintain it abutting said cylinder closed end wall, bore means in said cylinder closed end wall in communication with said tubular member, the inner surface of said cylinder surrounding said tubular member forming a second annular liquid chamber, diametral bore means in said cylinder closed end wall in communication with said bore means, a valve ball seat in said diametral bore means in communication with said bore means, other passage means in the cylinder closed end wall in communication with said annular liquid chamber and said diametral bore means, a non-return ball valve in said diametral bore means adapted to seat on said seat to cut off communication between said first liquid and second liquid chambers, biasing means in said diametral bore means normally maintaining said valve seated, and pin means operatively connected to said ball valve to unseat it.

2. The device of claim 1 wherein said tubular member has stop means limiting outward movement of said plunger.

3. The device of claim 2 wherein stroke adjusting means are provided for limiting the stroke of said plunger.

4. The device of claim 3, wherein the stroke adjusting means comprise a sleeve surrounding and having screw-threaded engagement with the cylinder and an annular stop surface on the plunger to co-operate with the end of said sleeve, releasable locking means being provided to hold the sleeve against rotation.

5. The device of claim 3, wherein the stroke adjusting means comprise a sleeve axially movable with one of the relatively axially movable members constituted by the cylinder and plunger and having a stepped aperture therein, a radial projection on the other of said members extending into said aperture, and means for selectively positioning said sleeve in the rotational sense to align the radial projection with any one of the steps in the aperture.

* * * * *